United States Patent [19]

Lim et al.

[11] 4,325,847

[45] Apr. 20, 1982

[54] USE OF ADDITIONAL ALUMINA FOR EXTRA ZEOLITE STABILITY IN FCC CATALYST

[75] Inventors: John C. Lim, Anaheim; Adrian P. Humphries, Claremont; Dennis M. Stamires, Newport Beach, all of Calif.

[73] Assignee: Filtrol Corporation, Los Angeles, Calif.

[21] Appl. No.: 160,851

[22] Filed: Jun. 19, 1980

[51] Int. Cl.³ .............................................. B01J 29/08
[52] U.S. Cl. ................................................ 252/455 Z
[58] Field of Search ................................... 252/455 Z

[56] References Cited

U.S. PATENT DOCUMENTS

| | | | |
|---|---|---|---|
| 4,079,019 | 3/1978 | Scherzer et al. | 252/455 Z |
| 4,086,187 | 4/1978 | Lim et al. | 252/455 Z |
| 4,206,085 | 6/1980 | Lim et al. | 252/455 Z |

Primary Examiner—Carl F. Dees
Attorney, Agent, or Firm—Philip Subkow; Bernard Kriegel

[57] ABSTRACT

This invention relates to improvements in catalysts formed by spray drying water slurries of a faujasite type zeolite of relatively low sodium content in a matrix, containing pseudoboehmite and added anionically derived alumina gel.

10 Claims, 1 Drawing Figure

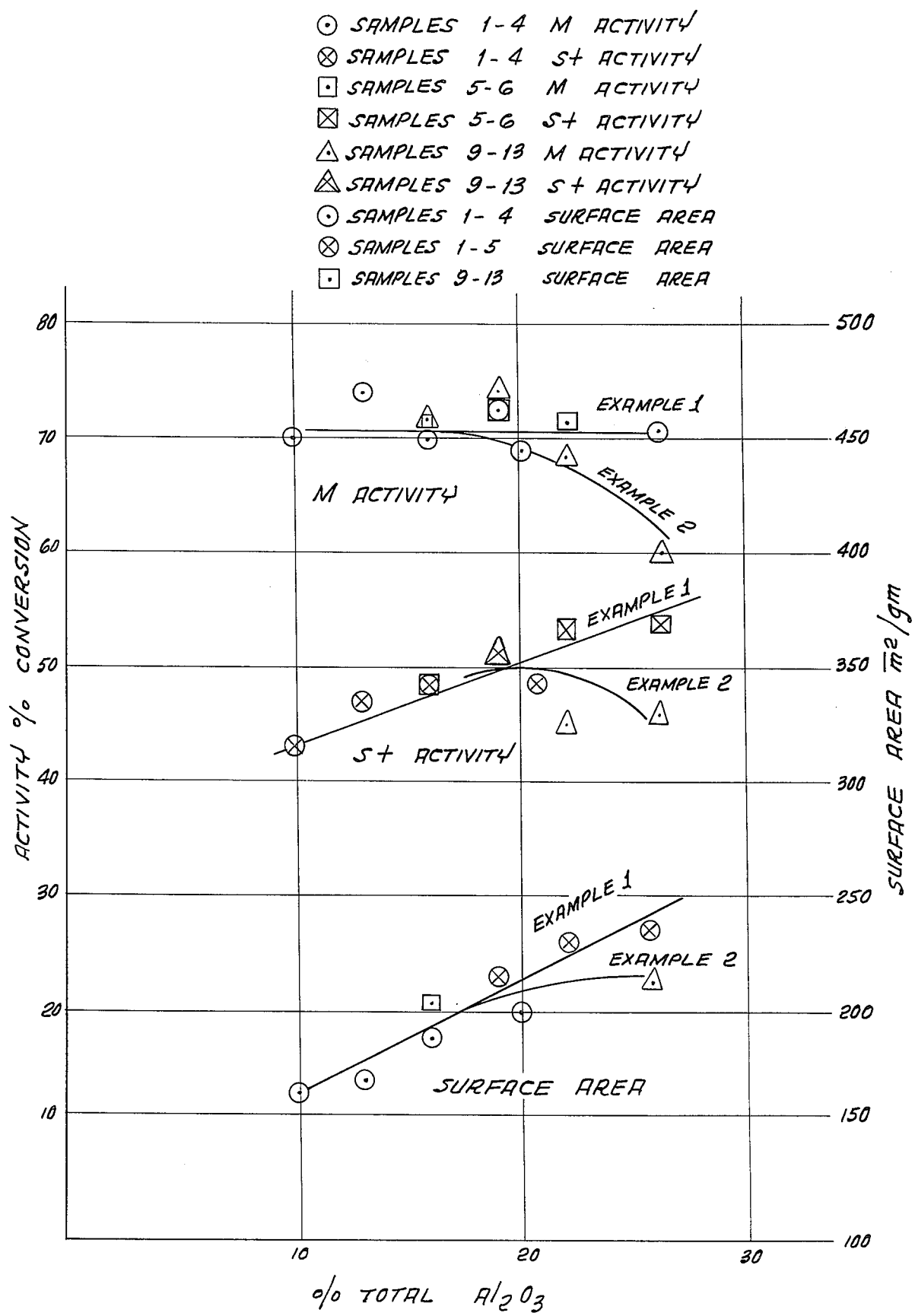

USE OF ADDITIONAL ALUMINA FOR EXTRA ZEOLITE STABILITY IN FCC CATALYST

BACKGROUND OF THE INVENTION

This invention relates to catalysts composed of a zeolite of the faujasite type which has been exchanged to reduce the sodium content of the zeolite and has been combined with a matrix containing clay and alumina. Such catalysts are widely used in commercial catalytic cracking and are composed of a Y zeolite which has been exchanged with a salt solution, such as ammonium, rare earth or both ammonium and rare earth salt solutions.

It has been reported that they are formed by spray drying a water slurry of the exchanged zeolite, alumina and clay to which additives such as ammonium polysilicate (see Lim, et al, U.S. Pat. No. 4,086,188) may be added to improve the attrition resistance of the catalyst.

Many forms of inorganic oxide gels, including alumina hydrate gels, have been suggested in the prior art as or as part of the matrix. The literature and patents disclosing such composition is voluminous. The combination of a matrix formed of clay and crystalline alumina hydrate of the pseudoboehmite form are disclosed in Secor et al U.S. Pat. No. 4,010,116 and Lim et al U.S. Pat. No. 4,086,188, and Lim et al, Ser. No. 3,407, now U.S. Pat. No. 4,206,085.

Such catalysts are rated for their activity by a bench scale test. Such a test determines the percent conversion of a feed stock in a cracking process employing a catalyst which has been steamed for two (2) hours at 1450° F. The percent conversion attained using such a steamed catalyst is known as M activity. The activity determined using a catalyst which has been steamed at 1550° F. for two (2) hours is termed S+ activity.

The M activity represents the so-called fresh activity, that is the activity when the catalyst is first introduced into the cracking system and the S+ activity represents the activity of the recirculated catalyst which has passed through the conversion and regeneration cycle, wherein it is subjected to a high temperature condition in the regenerator, and is then recirculated to the reactor.

The effect of the high temperature hydrothermal conditions in the regenerator results in a partial deactivation of the catalyst. The S+ activity is thus a measure of the stability of the catalytic properties of the catalyst as measured by its activity.

The pseudoboehmites differ in their rheological properties. The Type A pseudoboehmite and B Type pseudoboehmite are identified by a rheological test disclosed in Lim et al, U.S. Pat. No. 4,206,085. Both A Type pseudoboehmite and B Type pseudoboehmite will provide catalysts of the above Type compositions of satisfactory S+ activity.

As appears from the disclosure in the Lim, et al U.S. Pat. No. 4,206,085, in catalysts of the above composition, when tested by the bench scale test described in the patent, the M activity is largely insensitive to the concentration of pseudoboehmite and for this purpose pseudoboehmite of the B types are substantially as effective as those of the A type.

The magnitude of the S+ activity of a given composition of an exchanged zeolite and a matrix of clay and pseudoboehmite increases as the concentration of the pseudoboehmite is increased, while the concentration of the zeolite remains substantially the same.

The magnitude of the S+ activity as appears from the above is dependent on the character of the cation population, the silica to alumina molar ratio of the faujasite type zeolite as well as the concentration of the zeolite, clay and pseudoboehmite.

The attrition resistance is measured by a bench scale test described in the Secor et al Patent. The test measures the loss due to attrition after five (5) hours of the test as a percent of the original sample weight. This percentage figure is termed the Attrition Index. The lower this figure, the better the attrition resistance. Acceptable Attrition Index, for example, is one less than thirty (30), i.e., 30% loss after five (5) hours, and preferably twenty (20) to twenty-five (25) or less. A very desirable Attrition Index is less than twenty (20).

Not all forms of pseudoboehmite are equally suitable to impart a desirable attrition resistance to the spray dried catalyst.

As set for in said Lim et al supra, U.S. Pat. No. 4,206,085, the Type A alumina is superior to the Type B alumina in imparting a desirable attrition resistance. The pseudoboehmites of the A Type are materially improved as an addition to the matrix of a zeolite catalyst by the inclusion of ammonium polysilicates or of a silica gel of sufficiently fine particle size. (See Lim et al, U.S. Pat. Nos. 4,086,188 and 4,206,085.)

It has also been shown in Lim et al U.S. Pat. No. 4,206,185 that the unmilled B Type may not be employed as a total substitute for the A Type without substantially decreased attrition resistance. Only a minor fraction of the A pseudoboehmite may be substituted by the B Type if the B Type be sufficiently milled.

The said Lim et al patents (U.S. Pat. Nos. 4,086,188 and 4,206,085) are incorporated herein by this reference.

STATEMENT OF THE INVENTION

We have found that we may substitute alumina gel for a portion of the zeolite, clay and crystalline pseudoboehmite in a zeolite cracking catalyst, we may increase the S+ activity without any substantial impairment of its attrition resistance.

The effect of an increase in the concentration of the aluminas on the M and S+ activity of the catalyst, when the alumina in the spray dried catalyst is derived from pseudoboehmite alone, either Type A or Type B, is similar to the effect of the increase in the concentration of alumina by the addition of alumina gel when derived from an anionic aluminum source to the pseudoboehmite, in a catalytic composition. The M activity and the S+ activity derived from a mixture of pseudoboehmite (Type A or Type B or mixtures thereof) and alumina hydro gel of the above type in the catalyst slurry which is spray dried is similar to an increase in the concentration of the above pseudoboehmite (or mixture of pseudoboehmites). The added alumina gel, of the above type, in a zeolite, clay and pseudoboehmite composition improves the S+ activity without a substantial change in the M activity of the catalyst to which the gel-derived alumina is added. The increase in the concentration of the alumina, in such a catalyst either by addition of the pseudoboehmite or by the addition of the above gel in such a mixture, will result in an increase in the S+ activity.

The B Type alumina when substituted for an equal percent of A Type in a zeolite, clay, pseudoboehmite mixture substantially reduces the attrition resistance of the catalyst. The Attrition Index of such a catalyst is substantially greater than the same catalyst in which the alumina is derived entirely from Type A pseudoboehmite. However, the replacement of a part of the Type A pseudoboehmite by the alumina hydrate gel, derived from an anionic source, does not impair the attrition resistance of the spray dried catalyst. The Attrition Index of the above catalyst in which the alumina is all derived from Type A alumina is not materially changed by the substitution of part of the Type A alumina by the above alumina gel derived from an anionic aluminum source.

We have found that the above observations apply to alumina hydrate derived from an anionic aluminum source, such as sodium aluminate or potassium aluminate. Alumina hydrate gel derived from a cationic aluminum source such as aluminum sulfate or other salts of a strong acid such as chloride and nitrate is not an equivalent alumina gel for the purposes of our invention.

Alumina derived from a cationic aluminum source affects S+ activity of a pseudoboehmite containing catalyst of the above type adversely. An increase in the alumina content by adding cationically derived alumina to pseudoboehmite, zeolite, clay composition acts to reduce the M activity, and the S+ activity, while a like addition of an anionically derived alumina hydrate gel will improve the S+ activity without a substantial change in the attrition resistance.

In like manner, alumina hydrate gel derived from the cationic aluminum source when added to the matrix containing a Type A pseudoboehmite reduces the attrition resistance to a substantial degree.

The discovery that the cationic aluminum source produces an alumina hydrate gel which acts substantially different in the above catalyst system from that of the alumina hydrate gel produced from an anionic alumina source is surprising in view of Alafandi, et al, Ser. No. 06/081,655, filed Oct. 10, 1979, of which one of us is a joint applicant and which is assigned to the assignee of this application, wherein such gels are shown to have similar pore structures.

The data of the following Examples are charted in the accompanying drawing.

EXAMPLE I

A sodium Y (see Breck, U.S. Pat. No. 3,130,007) having a $SiO_2/Al_2O_3$ molar ratio of 4.8 and a sodium content equivalent to 13.8% percent by weight of $Na_2O$ was mixed with a sodium aluminate solution (pH 13) sufficient to introduce the percentages of $Al_2O_3$ based on the composite catalyst (zeolite and matrix) on a volatile free basis as shown in Table 1. The solution was adjusted to a pH of 5.7 with sulfuric acid to precipitate the alumina hydrate gel.

The water slurry of the above mixture was exchanged four (4) times with ammonium sulfate. The first exchange was carried out at ambient pressure and ambient temperature (75° F.) using ammonium sulfate (0.7 grams $(NH_4)_2SO_4$ per gram of the zeolite), all on a volatile free basis, to form a slurry containing 20% solids in the slurry. The slurry was stirred vigorously for an hour during which time the pH was maintained at about 5.0 to about 6.0 by addition of $H_2SO_4$. It was then filtered and washed with water until the wash water was substantially free of sulfate ions.

The filtered exchanged zeolite gel mixture was exchanged for a second time under the above conditions and controls except that the temperature during the exchange was held at 90° to 100° C.

The second exchange step was repeated two (2) more times to give a product which has been exchanged four (4) times.

The filter cake from the fourth exchange was dried overnight at 100° C.

The exchanged zeolite-alumina gel mixture had the following nominal analysis on a volatile free basis. The x-ray spectrum confirmed the analysis that the exchanged zeolite was a type Y zeolite of (4.8) $SiO_2/Al_2O_3$ molar ratio mixed with alumina gel equivalent to the stated percentages expressed as the equivalent $SiO_2$ (anhydrous). The sodium content of the zeolite-gel mixture, when expressed as the equivalent $Na_2O$ is about 2.5% on a volatile free basis.

The product produced as above is an exchanged zeolite which is intimately and substantially uniformly mixed with the alumina hydrate gel.

The zeolite-gel mixture was dispersed in water to which ball clay (a kaolin clay) and Type A pseudoboehmite were intimately mixed to form the water slurry to be spray dried.

To this mixture was added ammonium polysilicate (see Lim, et al, U.S. Pat. No. 4,086,188). In the following Table 1, the percent $SiO_2$ is that equivalent to the percent by weight, on an anhydrous basis, of the added polysilicate.

The type A pseudoboehmite prior to addition to the slurry was peptized by mixing with formic acid in the following ratios:

0.095 ml. of 90% formic acid per volatile free gram of alumina

The slurry was thoroughly and vigorously mixed and spray dried to form "microspheres" of from about 50 to 70 microns nominal diameter.

The spray dried catalyst was subjected to the five (5) hour attrition test.

The spray dried microspheres were subjected to a cracking activity test to determine its M and S+ activity. The test is described in the appendix.

Eight samples were prepared. In samples 1 through 4, the concentration of the pseudoboehmite was 10% of the volatile free weight of the composite catalyst, evaluated as the equivalent anhydrous $Al_2O_3$. In samples 2, 3, and 4, the added alumina as gel was 3%, 6% and 10% on a volatile free basis of the composite catalyst evaluated as the equivalent anhydrous $Al_2O_3$.

In samples 5 through 8, the pseudoboehmite was 16% instead of 10% as above and the alumina added as gel were in percent the same as in samples 2, 3, and 4, i.e., 3%, 6% and 10%. The related M and S+ activity and the Attrition Index (AI) of the samples are given in Table 1. The catalyst was evaluated for surface area by the test procedure given in the appendix.

TABLE 1

| Sample | % Alumina Total | Gel % | Y % | % Clay | % $SiO_2$ | AI | M | S+ | Surface Area |
|---|---|---|---|---|---|---|---|---|---|
| 1 | 10 | 0 | 18 | 67 | 5 | 24 | 70 | 43 | 164 |
| 2 | 13 | 3 | 18 | 64 | 5 | — | 74 | 47 | 170 |
| 3 | 16 | 6 | 18 | 61 | 5 | 25 | 70 | 48 | 184 |
| 4 | 20 | 10 | 18 | 57 | 5 | 26 | 69 | 49 | 201 |
| 5 | 16 | 0 | 18 | 61 | 5 | 18 | 72 | 48 | 205 |
| 6 | 19 | 3 | 18 | 58 | 5 | 19 | 72 | 51 | 213 |
| 7 | 22 | 6 | 18 | 55 | 5 | 24 | 72 | 53 | 227 |

TABLE 1-continued

| Sample | % Alumina Total | Gel | Y % | % Clay | % SiO$_2$ | AI | M | S+ | Surface Area |
|---|---|---|---|---|---|---|---|---|---|
| 8 | 26 | 10 | 18 | 51 | 5 | 20 | 71 | 54 | 237 |

The above M and S+ data are plotted on FIG. 1. It will be observed that both S+ activity and the surface have a linear relation to the percent of added alumina gel.

EXAMPLE II

In this example, because of the high alkalinity of sodium Y and its sensitivity to highly acid conditions which would occur when the highly acid aluminum sulfate used in this example as the alumina source, an exchanged zeolite of relatively low sodium content is employed.

The sodium Y zeolite of Example I in the absence of added alumina is exchanged four (4) times according to the exchange procedure of Example 1. The zeolite had a sodium content expressed as the equivalent Na$_2$O of about 2.5% on a volatile free basis.

A solution of aluminum sulfate in deionized water at a pH of 3 was mixed with the above exchanged zeolite. The pH of the mixture rose to pH 3.2. Ammonium hydroxide was added to the above slurry with vigorous mixing until the pH reached 5.5. The mixture which was quite viscous, filtered slowly and was washed with some difficulty until the wash water was substantially sulfate free.

The above filter cake was combined with the same ingredients (ball clay, pseudoboehmite, and ammonium polysilicate) in like ratios as in Example I, in four samples in the proportions of total as stated in Samples 5 through 8 (in Table 1) and similarly mixed and spray dried as in Example I.

The M, S+ and surface areas were determined as in Example I, Table 2 gives the results.

TABLE 2

| Samples | % Al$_2$O$_3$ Total | Gel | AI | M | S+ | Surface Area |
|---|---|---|---|---|---|---|
| 9 | 16% | 0 | 18 | 72 | 48 | 205 |
| 10 | 19% | 3 | 30 | 75 | 52 | |
| 11 | 22% | 6 | 33 | 68 | 45 | |
| 12 | 26% | 10 | 42 | 60 | 46 | 229 |

The data of Table 2 are plotted in FIG. 1.

While limited quantities of the alumina hydrate derived from the cationic aluminum source do not cause a substantial increase in the S+ activity of the pseudoboehmite containing catalyst (see Samples 9 and 10 of Table 2), a further increase in the concentration of the cationic alumina causes a substantial deterioration in the M and S+ activity (see Samples 11 and 12 of Table 2).

In contrast, the alumina hydrate derived from the anionic aluminum source causes a progressive increase in the S+ activity without substantially affecting the M activity (see Table 1). The effect of the added anionic alumina in this case is the same as the effect of added pseudoboehmite to make the S+ activity approach the M activity more closely as the total Al$_2$O$_3$ concentration increases.

As has been pointed out in said Lim, et al application (supra), the practical limit for a Y type faujasite is about 10% to about 40% of the alumina to cause an increase of about 50% in the S+ activity. A similar result is obtained where instead of the crystallized pseudoboehmite to increase the alumina content above 10%, the increase is obtained by added alumina gel derived from the anionic alumina source, herein referred to as anionic alumina hydrate gel.

For purposes of increasing the S+ activity of a catalyst system composed of an exchanged zeolite, clay, and pseudoboehmite, alumina derived from the anionic aluminum source acts similarly to the crystallized pseudoboehmite. As will be seen by comparing the change of S+ activity to the change in total alumina for the system of the A and B type aluminas as reported in the above Lim, et al patent, the order of the effect of the increase in concentration of aluminas on increase in the S+ activity is not dependent on the nature of the cation systems of the zeolite. The absolute magnitude of the catalytic activity for the various percentage of alumina may vary for different types of zeolites and cation population in the zeolites and different matrix composition and ratios. To all such systems in which pseudoboehmites are employed, the increase in the concentration of alumina by addition of anionic alumina according to our invention will improve the S+ activity.

While we do not wish to be bound by any theory as to why the catalysts of our invention perform in the superior manner by the addition of alumina according to our invention, we do note that both the S+ and surface area are a linear functions (see FIG. 1), of the total alumina content of such catalysts containing added anionic alumina. While the ratios are not the same, the increase is in the surface area and the S+ activity are linear functions of the total alumina content.

Unlike Type B alumina in the unmilled state, (See Lim et al U.S. Pat. No. 4,206,085) the alumina hydrate gel derived from anionic aluminum source when added to the pseudoboehmite in the matrix makes an unsubstantial and acceptable change in the Attrition Index. In contrast, the alumina hydrate gel derived from the cationic aluminum source makes a substantial and unacceptable increase in the attrition resistance. (See supra, Table 1 and Table 2 and the FIGURE).

We are therefore able to obtain an improvement in S+ activity of a spray dried faujasite catalyst system of the above type, without a substantial change in the attrition resistance, by substituting for the pseudoboehmite, an amount of anionic alumina, i.e. an alumina derived from alumina hydrate produced by hydrolysis of an anionic aluminum source. We may use either sodium aluminate, or other soluble sources of aluminum whose water solutions are substantially above pH 7, i.e. about pH 9 or more, and reduce the pH by addition of acidic compounds other than cationic aluminum. That is, we avoid adding alumina sources in which the aluminum is a cation. A convenient source of acid for gelation of the alumina gel is sulfuric acid, nitric acid or hydrochloric acid, i.e. the strong mineral acids.

The acid is added to the zeolite mixed with the aluminate with vigorous agitation to cause gelation of the alumina. The mixture is separated from the mother liquor, preferably by filtration and washed. Since the gel is formed from an anionic aluminum source by acidification, the resultant mother liquor will contain a cation which may be undesirable for incorporation into the zeolite. Since the conventional source of a Y zeolite is the sodium which we wish to exchange into its low sodium form, we have found it advantageous to combine the exchange of the sodium in the sodium zeolite with the conversion of the anionic aluminum source usually sodium or potassium aluminate into an intimate mixture of the unexchanged or partially exchanged sodium zeolite and the alumina hydrate by mixing the sodium zeolite with a solution of the anionic aluminum source at a pH substantially above pH of 7, acidifying said mixture by addition of an acidic compound to reduce the pH to substantially less than 7, and exchanging the sodium of the zeolite by substitution of the cation of said acidic compound and converting the anionic aluminum source into the alumina hydrate gel. The acidification of the sodium zeolite-aluminate mixture whereby the gel is formed may result in partial exchange of the sodium zeolite to replace some sodium by hydrogen. Instead of the acids, we may use an acid salt, for example, ammonium sulfate or rare earth acid salts to reduce the pH substantially below 7, to form the gel and also to partially exchange the sodium of the zeolite with the cation of the acid salt.

The mixture of the zeolite and alumina hydrate gel may then be combined in a slurry with the clay component and also pseudoboehmite and preferably also ammonium polysilicate and said slurry may then be spray dried to form particles referred to as microspheres. We may use crystalline pseudoboehmite of various rheological properties (for example, Type A or Type B) where the objective is a catalyst of satisfactory temperature stability, i.e. of desirable S+ activity. Where the objective is such catalyst of desirable attrition resistance, we prefer to employ either peptized Type A alone or where Type A is in admixture with Type B to use the Type B in the form of a milled or milled and peptized Type B as described in Lim, et al U.S. Pat. No. 4,206,085 (supra). We prefer however in order to employ peptized Type A as the crystalline pseudoboehmite component and to supplement the Type A pseudoboehmite with the added anionic aluminum derived alumina hydrate.

Preferably the mixture of zeolite and alumina hydrogel is washed to remove undesirable anions and other soluble impurities before mixing with the other components of the slurry. It is desirable to reduce the sodium content of the zeolite so that in admixture with the other components of the slurry mixture, the spray dried microspheres shall contain less than about 1% by weight of sodium calculated as $Na_2O$ on a volatile free basis.

Thus, for example, the exchange of the zeolite in the mixture with the gel is preferably condensed to a degree to reduce the sodium content of the mixture of gel and zeolite to an amount when expressed as $Na_2O$ of about 0.1% to about 5% of the gel and zeolite on a volatile free basis.

A catalyst precursor slurry according to our invention is composed of an intimate mixture of solids, said solids comprising a zeolite of the faujasite type, aluminum hydrate gel derived from an anionic alumina source, pseudoboehmite and kaolin clay, the weight ratio of the said zeolite ranging from about 5 to 50% by weight, the hydrated alumina, from about 2% to about 30%, the pseudoboehmite from about 10% to about 30% and the kaolin from about 20% to about 80%, and preferably to add from about 2% to about 15% of $SiO_2$, equivalent to the weight of the ammonium polysilicate all based on the weight of composite catalyst on a volatile free basis.

The ratio of the weight of the $Al_2O_3$, equivalent to the weight of the gel, to the total weight of the alumina $Al_2O_3$ in the zeolite composition, on a volatile free basis, may be in the range of 2% to 75% of the total weight alumina, the remainder of the $Al_2O_3$ being equivalent to the weight of pseudoboehmite in the zeolite composition on a volatile free basis.

The intimate and uniform mixture of gel and exchanged zeolite is filtered and washed. The filter cake is combined with the other components of the slurry.

The slurry is spray dried to form microspheres. The said microspheres containing from 5% to about 20% water. The dried solid have the ratio of components on a volatile free basis as in the slurry composition as above stated.

The spray dried slurry may then be mixed with a solution containing a desired cation to further reduce the sodium content by exchange, for example, with ammonium sulfate or with a rare earth salt or by both.

The zeolite in the spray dried catalyst is preferably a Y zeolite which has been exchanged with ammonium or rare earth ions or both ammonium and rare earth ions to reduce the sodium in the catalyst (expressed as the equivalent $Na_2O$) to less than 1% by weight.

The catalyst of our invention is highly active catalysts with superior S+ activity in cracking of petroleum hydrocarbons in the process commonly practiced.

The best mode presently contemplated by the applicants for carrying out our invention is described in Example I, employing 26% of total alumina ($Al_2O_3$ volatile free) with 10% of the catalyst composition on a volatile free basis derived from the anionic source as in Sample 8 of Example I.

APPENDIX

The identification of volume and surface areas of pores of various configurations in any system of pores in a porous solid is still empirically determined. A common method is to employ nitrogen to develop an adsorption isotherm and also in some cases a desorption isotherm. The value of the total pore volumes, the total surface area of the pores of a porous solid are determined from the isotherms [see Brunauer "Adsorption of Gases and Vapors", Vol. 1, Princeton University Press, 1943, Brunauer et al., J.A.C.S. Vol. 60, pg. 309, etc. (1938)].

A widely used test and one employed in the determination of the surface areas and pore volumes in this application determines them from nitrogen isotherms and employs a computerized apparatus, as is identified as follows. (Digisorb 2500 manufactured by the Micromeritic Instrument Corp. of 5680 Goshen Springs Road, Norcross, Georgia 30071).

The sample is dried by heating at about 500° F. until it is volatile free under these conditions. The procedure employing this instrument determines the parameters for a nitrogen adsorption and a desorption isotherm and determines the so-called B.E.T. surface area by application of equation as given on page 312 of the above J.A.C.S. article (known as the B.E.T. equation). The slope and intercept of the linear relation according to that equation is determined. The equation evaluates the volume of the gas as a mono molecular layer of nitrogen adsorbed on the surfaces of the pores. From the known diameter of the nitrogen molecule and the volume of the mono-layer, the magnitude of the surface of the pores carrying the monolayer is evaluated. To evaluate the slope and intercept of the above linear relation, the separate values of the relative pressure (P/Po) of the selected portion of the isotherm are chosen. P is the local pressure selected and Po is the saturation pressure.

The linear relation is determined as the least square fit to the above B.E.T. linear equation.

The B.E.T. Surface area (S) in meters square per gram is given by the following equation which includes the value of the area covered by the nitrogen molecule 16.2$\mathring{A}^2$. According to the equation:

$$S = (4.35/a + b) \qquad \text{Equation 1}$$

where "a" is the above intercept of the linear relation and "b" is the slope of said linear relation. This value is referred to as the B.E.T. surface, and is so referred to in this application.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil passed through a preheat zone and through a bed of the microspheres maintained at a tempurature of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which is hydrogen, isopentane, and hexanes is determined and their weight percent of the feed determined. The weight percent of the liquid charge is determined from the following relation:

F is the weight of the oil passing through the reactor;

L is the weight of the liquid product which is collected as condensate;

R is the percent by weight of the fraction of the liquid condensate which boils above 421° F.;

H is the grams of liquid held up in the reactor exit line and around the reactor, receiver and joints. In the above test it has been determined that it constitutes three percent of the feed F. The weight percent conversion (%C) is given by the following relationship.

$$\% C = \frac{F - \frac{R \times L}{100} - .03H}{F} \times 100$$

The conversion using the catalyst steamed at 1450° F. is termed M, the one steamed at 1500° F. is termed S and the one at 1550° F. is termed S+ conversion.

The reaction of %C as determined by the above test to the activity such S+ is determined by the test referred to in the Lim et al U.S. Pat. No. 4,206,085 is given by the following relation:

C% (Lim et al U.S. Pat. No. 4,206,085) = %C (as above × 1.008 + 0.32)

We claim:

1. A method of forming a catalyst which comprises mixing a sodium containing zeolite with an anionic aluminum source in water at a pH substantially above 7, adding an acidic compound and reducing the pH to substantially less than 7 and forming alumina hydrate gel in said water-zeolite mixture adding pseudoboehmite and clay to said water mixture to form a slurry and spray drying said slurry.

2. A method of forming a catalyst which comprises mixing a sodium containing zeolite with an anionic aluminum source in water at a pH substantially above 7, adding an acid or an acidic salt and exchanging the sodium with a cation of said acidic compound, and reducing the pH to substantially less than 7 and forming alumina hydrate gel in said water-zeolite mixture adding pseudoboehmite and clay to said water mixture to form a slurry and spray dring said slurry.

3. A method of forming a catalyst which comprises mixing a sodium containing zeolite with an anionic aluminum source in water at a pH substantially above 7, adding an acidic compound and reducing the pH to substantially less than 7 and forming alumina hydrate gel in said water-zeolite mixture adding Type A pseudoboehmite and clay to said water mixture to form a slurry and spray drying said slurry.

4. A method of forming a catalyst which comprises mixing a sodium containing zeolite with an anionic aluminum source in water at a pH substantially above 7, chosen from the group consisting of an acid or an acidic salt and exchanging sodium with a cation of said acidic component, and reducing the pH to substantially less than 7, and forming alumina hydrate gel in said water-zeolite mixture adding Type A pseudoboehmite and clay to said water mixture to form a slurry and spray drying said slurry.

5. A method of forming a catalyst which comprises mixing a sodium containing zeolite with an anionic aluminum source in water at a pH substantially above 7, adding a component chosen from the group of an acid or an acidic salt and exchanging sodium with a cation of said acidic component, and reducing the pH to substantially less than 7 and forming alumina hydrate gel and reducing the sodium in said zeolite by exchange with a cation of said acid or acidic salt in said water-zeolite-alumina gel mixture, adding a mixture of Type A and Type B pseudoboehmite and clay to said water mixture to form a slurry and spray drying said slurry.

6. The process of claim 1, 2, 3, 4, or 5, in which the sodium content of the catalyst is less than 1% by weight expressed as $Na_2O$ on a volatile free basis.

7. The process of claim 1, 2, 3, 4, or 5, in which the sodium content of the zeolite alumina hydrate mixture, prior to admixture with the pseudoboehmite in the slurry is less than about 5% by weight of the zeolite on a volatile free basis.

8. The process of claim 1, 2, 3, 4, or 5, in which the slurry contains from about 5% to 50% by weight of the zeolite and alumina hydrate gel from about 2% to about 30%, pseudoboehmite from about 10% to about 30%, and kaolin clay from about 20% to about 80%, and ammonium polysilicate equivalent to about 2% to 15% expressed as $SiO_2$, all based on the composite catalyst on a volatile free basis.

9. The process of claim 1, 2, 3, 4, or 5, in which the ratio of the weight of alumina hydrate gel to the total weight of pseudoboehmite and alumina hydrate both expressed as equivalent $Al_2O_3$ on a volatile free basis is from about 25% to about 75% of the total weight of alumina on a volatile free basis.

10. The process of claims 1, 2, 3, 4, or 5, in which the slurry contains from about 5% to about 50% by weight of the zeolite, and alumina hydrate gel from about 2% to about 30%, pseudoboehmite from about 10% to about 30%, and kaolin clay from about 20% to about 80%, and from about 2% to about 15% of ammonium polysilicate equivalent to about 2% to 15% expressed as $SiO_2$, all on a volatile free basis based on the catalyst and the ratio of the weight of alumina hydrate gel to the total weight of the alumina hydrate gel and the pseudoboehmite both expressed as the equivalent $Al_2O_3$ on a volatile free basis is in the range of about 2% to about 75% of said total weight of the $Al_2O_3$.

* * * * *